(12) United States Patent
Liu et al.

(10) Patent No.: US 12,511,799 B2
(45) Date of Patent: Dec. 30, 2025

(54) PET IMAGE RECONSTRUCTION METHOD BASED ON SWIN-TRANSFORMER REGULARIZATION

(71) Applicant: ZHEJIANG UNIVERSITY, Zhejiang (CN)

(72) Inventors: Huafeng Liu, Hangzhou (CN); Rui Hu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 399 days.

(21) Appl. No.: 18/014,137

(22) PCT Filed: Nov. 9, 2022

(86) PCT No.: PCT/CN2022/130794
§ 371 (c)(1),
(2) Date: Dec. 30, 2022

(87) PCT Pub. No.: WO2024/011797
PCT Pub. Date: Jan. 18, 2024

(65) Prior Publication Data
US 2024/0249450 A1 Jul. 25, 2024

(30) Foreign Application Priority Data
Jul. 11, 2022 (CN) .......................... 202210856039.8

(51) Int. Cl.
*G06T 11/00* (2006.01)
*G06N 3/08* (2023.01)
(Continued)

(52) U.S. Cl.
CPC .............. *G06T 11/005* (2013.01); *G06T 5/20* (2013.01); *G06T 5/50* (2013.01); *G06V 10/44* (2022.01);
(Continued)

(58) Field of Classification Search
CPC . G06T 11/005; G06T 5/20; G06T 5/50; G06T 2207/20221; G06T 2211/424;
(Continued)

(56) References Cited

U.S. PATENT DOCUMENTS

2021/0304457 A1\* 9/2021 Qi ........................... G06T 7/246

FOREIGN PATENT DOCUMENTS

| CN | 112053412 A | * 12/2020 | ........... G06T 11/005 |
| CN | 113658057 A | * 11/2021 | ............... G06N 3/04 |

OTHER PUBLICATIONS

Pan, Zhang, Wu, Gao and Wu, "Multi-domain Integrative Swin Transformer network for Sparse-View Tomographic Reconstruction", https://arxiv.org/abs/2111.14831, Feb. 25, 2022 (Year: 2022).*

(Continued)

*Primary Examiner* — Henok Shiferaw
*Assistant Examiner* — Dion J Satcher
(74) *Attorney, Agent, or Firm* — Jiwen Chen; Joywin IP Law PLLC

(57) ABSTRACT

The present invention discloses a PET image reconstruction method based on Swin-Transformer regularization, the reconstruction model adopted is composed of several iterative modules, each iterative module consists of three parts: a EM iterative layer, a Swin-transformer based regularization layer, a pixel to pixel image fusion layer, the regularization layer is used to learn the prior information representing the image, comprising a convolution kernel used to extract the shallow features of the image, a Swin-Transformer layer used to extract the deep features of the image, and a convolution layer and a residual connection are used to fuse deep and shallow features. The image fusion layer fuses the results of EM iteration and regularization. The invention can reconstruct high quality PET images from Sinogram projection data, and greatly reduces the noise level of PET images while retaining the structural information.

7 Claims, 3 Drawing Sheets

(51) Int. Cl.
  *G06T 5/20* (2006.01)
  *G06T 5/50* (2006.01)
  *G06V 10/44* (2022.01)
  *G06V 10/80* (2022.01)
(52) U.S. Cl.
  CPC .. *G06V 10/806* (2022.01); *G06T 2207/20221* (2013.01)
(58) Field of Classification Search
  CPC ............. G06T 2211/441; G06T 11/006; G06T 2207/10104; G06T 2207/20081; G06T 2207/20084; G06V 10/44; G06V 10/806; G06N 3/08
  USPC .................................................. 382/131, 382
  See application file for complete search history.

(56) References Cited

OTHER PUBLICATIONS

A. Mehranian and A. J. Reader, "Model-Based Deep Learning PET Image Reconstruction Using Forward-Backward Splitting Expectation-Maximization," in IEEE Transactions on Radiation and Plasma Medical Sciences, vol. 5, No. 1, pp. 54-64, Jan. 2021 (Year: 2021).*

Liu, Ning, Cao, Wei, Zhang, Lin and Hu, "Video Swin Transformer", https://arxiv.org/abs/2106.13230, Jun. 25, 2021 (Year: 2021).*

Guo, Shiyao, et al. "PET Image Reconstruction with Multiple Kernels and Multiple Kernel Space Regularizers." arXiv preprint arXiv:2103.02813 (2021). (Year: 2021).*

Pan, Jiayi, et al. "Multi-domain integrative Swin transformer network for sparse-view tomographic reconstruction." Patterns 3.6 (2022). (Year: 2022).*

Mehranian, Abolfazl, and Andrew J. Reader. "Model-based deep learning PET image reconstruction using forward-backward splitting expectation-maximization." IEEE transactions on radiation and plasma medical sciences 5.1 (2020): 54-64. (Year: 2020).*

Liu, Ze, et al. "Video swin transformer." Proceedings of the IEEE/CVF conference on computer vision and pattern recognition. 2022. (Year: 2022).*

K. Gong et al., "Iterative PET Image Reconstruction Using Convolutional Neural Network Representation," in IEEE Transactions on Medical Imaging, vol. 38, No. 3, pp. 675-685, Mar. 2019, doi: 10.1109/TMI.2018.2869871.

H. Lim, I. Y. Chun, Y. K. Dewaraja and J. A. Fessler, "Improved Low-Count Quantitative PET Reconstruction With an Iterative Neural Network,", in IEEE Transactions on Medical Imaging, vol. 39, No. 11, pp. 3512-3522, Nov. 2020, doi: 10.1109/TMI.2020.2998480.

\* cited by examiner

PET IMAGE RECONSTRUCTION METHOD BASED ON SWIN-TRANSFORMER REGULARIZATION

This is a U.S. national stage application of PCT Application No. PCT/CN2022/130794 under 35 U.S.C. 371, filed Nov. 9, 2022 in Chinese, claiming priority of Chinese Application No. 202210856039.8, filed Jul. 11, 2021, all of which are hereby incorporated by reference.

TECHNICAL FIELD

The present invention belongs to the field of PET imaging technology, in particular to a PET image reconstruction method based on Swin-Transformer regularization.

DESCRIPTION OF RELATED ART

Positron emission tomography (PET) is one of the important tools for functional imaging, which has been widely studied in oncology, cardiology, neurology and medical research. However, due to many physical degradation factors and the ill-posed characteristic of PET reconstruction problems, PET images usually suffer from high levels of noise, especially in clinical practice, the trade-off between image quality and injection dose is a very difficult problem. Increasing the injection dose can enhance the quality of PET image reconstruction, but the increase of the dose means that it will inevitably bring radiation effects to patients. In actual diagnosis, it is very meaningful to use smaller dose to achieve the same level of diagnosis and detection effect as high dose. Therefore, how to reconstruct high quality PET images from low dose projection data is the current research focus.

Deep learning technology, especially supervised learning technology, has received extensive attention recently, and has shown great application potential in PET image reconstruction. Among them, direct learning method, back-end denoising method and model-based learning method are three mainstream methods for PET image reconstruction using deep learning. The direct learning method usually directly learns the mapping from sinogram projection map to PET image through deep neural network. Because there is no physical constraint, the direct learning method needs a lot of training data, and the structure is not stable enough. The back-end denoising method is relatively simple to implement, but the final result is greatly affected by the previous reconstruction algorithm.

Model-based learning method shows good effect and good interpretability by expanding an iterative reconstruction algorithm, which is a promising direction, such as literature [K. Gong et al., "Iterative PET Image Reconstruction Using Convolutional Neural Network Representation," in IEEE Transactions on Medical Imaging, vol. 38, no. 3, pp. 675-685, March 2019, doi: 10.1109/TMI.2018.2869871] proposes an unrolled network based on three-dimensional U-net and alternating direction method of multiplier (ADMM). The literature [H. Lim, I. Y. Chun, Y. K. Dewaraja and J. A. Fessler, "Improved Low-Count Quantitative PET Reconstruction With an Iterative Neural Network," in IEEE Transactions on Medical Imaging, vol. 39, no. 11, pp. 3512-3522, November 2020, doi: 10.1109/TMI.2020.2998480] expands an iterative algorithm by using U-net, and the coordinate descent is used to solve the problem. These methods all use convolutional neural networks to assist reconstruction. However, the convolution operator has a local receptive field, which leads to that CNNs can only deal with long-distance dependence through a large number of layers. When the number of layers increases, feature resolution and fine details may be lost, which potentially limits the quality of the reconstructed image.

SUMMARY OF THE INVENTION

In view of the above, the present invention provides a PET image reconstruction method based on Swin-Transformer regularization, which can reconstruct high-quality PET images from Sinogram projection data, and greatly reduces the noise level of PET images while retaining the structural information.

A PET image reconstruction method based on Swin-Transformer regularization, comprising the following steps:
(1) detecting a biological tissue injected with a normal dose of tracer, collecting a Sinogram projection data $S_1$ corresponding to the normal dose, and then conducting PET reconstruction of the Sinogram projection data $S_1$ to obtain a corresponding PET activity map $P_1$.
(2) downsampling the Sinogram projection data $S_1$ to obtain a low-dose Sinogram projection data $S_2$.
(3) performing steps (1) and (2) for many times to obtain a large number of samples, each sample contains $P_1$ and $S_2$, and then dividing all samples into a training set, a verification set and a test set.
(4) building a TransEM model based on Swin-Transformer regularization, using $S_2$ in the training set samples as an input, $P_1$ as a label, and training the model to obtain a PET image reconstruction model.
(5) inputting the $S_2$ in the test set sample into the PET image reconstruction model, and then directly outputting a corresponding PET activity map.

Further, the TransEM model is composed of several iterative modules cascaded, and each iterative module is composed of an EM iterative layer, a regularization layer based Swin-transformer, and a pixel to pixel image fusion layer connected in turn.

Further, the specific mathematical operation mode of the EM iteration layer is as follows:

$$x_{EM}^k = x^{k-1} \frac{1}{\sum A^T \cdot 1} \sum A^T \cdot \frac{y}{A \cdot x^{k-1}}$$

wherein, $x_{EM}^k$ represents the output image of EM iteration layer in the kth iteration module, $x^{k-1}$ represents the input image of EM iteration layer in the kth iteration module, i.e. the output image of the k−1 iteration module, k represents the natural number greater than 1, A represents the forward projection operator, $A^T$ represents the back projection operator, y represents the Sinogram projection data $S_2$ input to the model, 1 represents the normalized image with the pixel value of 1, and the image size is the same as the Sinogram projection data $S_2$. Both the forward projection operator A and the back projection operator $A^T$ are simulated by the siddon ray method, and the accumulator $\Sigma$ represents the pixel value accumulation.

Further, the regularization layer is composed of a convolution layer D1, a Swin-Transformer layer and a convolution layer D2, wherein:
the convolution layer D1 is used to extract shallow features of the input image, and the convolution kernel size is 3×3;

the Swin-Transformer layer is used to extract deep features of the image, adopting a window shift attention mechanism, and the window size is 4×4;

The convolution layer D2 uses residual connection to fuse the deep and shallow features of the image, and then outputs, the convolution kernel with a size of 3×3.

Further, the Swin-Transformer layer consists of a layer normalization module L1, a shifted-window multi-head self-attention layer, a layer normalization module L2, and a full connection layer connected in turn. The output of the shifted-window multi-head self-attention layer and the output of the convolution layer D1 are superposed as the input of the layer normalization module L2.

Further, the input of the convolution layer D2 is the result of the superposition of the input of the layer normalization module L2, the output of the full connection layer and the output of the convolution layer D1. The output of the convolution layer D2 is superposed with the input of the convolution layer D1 as the final output of the regularization layer.

Further, the image fusion layer is used to fuse the output results of the EM iteration layer and the regularization layer at the pixel level. The specific mathematical operation mode is as follows:

$$x^k = \frac{2x_{EM}^k}{1 - \frac{r^k}{\alpha \sum A^T \cdot 1} + \sqrt{(1 - \frac{r^k}{\alpha \sum A^T \cdot 1})^2 + 4 \frac{x_{EM}^k}{\alpha \sum A^T \cdot 1}}}$$

wherein, $x^k$ represents the output result of the image fusion layer in the kth iteration module, that is, the output image of the kth iteration module, $r^k$ represents the output image of the regularization layer in the kth iteration module, and $x_{EM}^k$ represents the output image of the EM iteration layer in the kth iteration module, a is the learnable parameter of the model.

Further, the specific process of training the TransEM model in step (4) is as follows:

4.1 initializing model parameters, including learnable parameters, convolution layer parameters, learning rate, optimization algorithm, and a maximum number of iterations;

4.2 inputting the Sinogram projection data $S_2$ in the training set sample into the TransEM model, forward propagation calculating to obtain the output results of each iteration module, and selecting the output results of the last iteration module as the PET activity map obtained by model reconstruction;

4.3 calculating the loss function between the PET activity map obtained from the model reconstruction and the corresponding label, and using gradient descent method to backpropagation update the model parameters according to the loss function;

4.4 using the optimization algorithm to update the model parameters iteratively until the loss function is minimized to converge or reaches the maximum number of iterations, that is, the training is completed.

Further, when the model training is completed, the validation set samples are used to validate the model, and the model parameters are fine tuned according to performance of the model in the validation set as the final PET image reconstruction model.

The present invention proposes to introduce Swin-transformer regularization into PET iterative reconstruction process. Comparing with traditional digital image prior regularization and regularization based on convolutional neural network, the present invention can model and characterize long-distance dependence in PET images, especially the correlation information between different organizations. The present invention has good recovery effect on structural information and good noise suppression effect, and the present invention is superior to the existing PET iterative reconstruction method driven by deep neural network.

The present invention proposes to add a convolution layer before and after the traditional Swin-transformer layer to extract shallow features and fuse them with deep shallow features, so that the present invention can achieve a good training effect without a large number of training data. In the specific embodiment, only data with hundreds of slices are used, which is superior to the existing PET image processing method based on the transformer in terms of data volume requirements.

The present invention performs well on low dose projection data, and in actual application, it can well alleviate the problem of patient radiation dose exposure. In the experiment, we used low dose data with 10 times down sampling to achieve a comprehensive improvement in PSNR, SSIM and MCRC compared with existing methods (FBSEM, etc.), which means that patients can achieve the same measurement results as full dose only by receiving $\frac{1}{10}$ of the radiation dose to a certain extent.

DETAILED DESCRIPTION OF THE INVENTION

In order to describe the present invention more specifically, the technical scheme of the present invention is described in detail below in combination with the drawings and specific embodiments.

Figure 1:
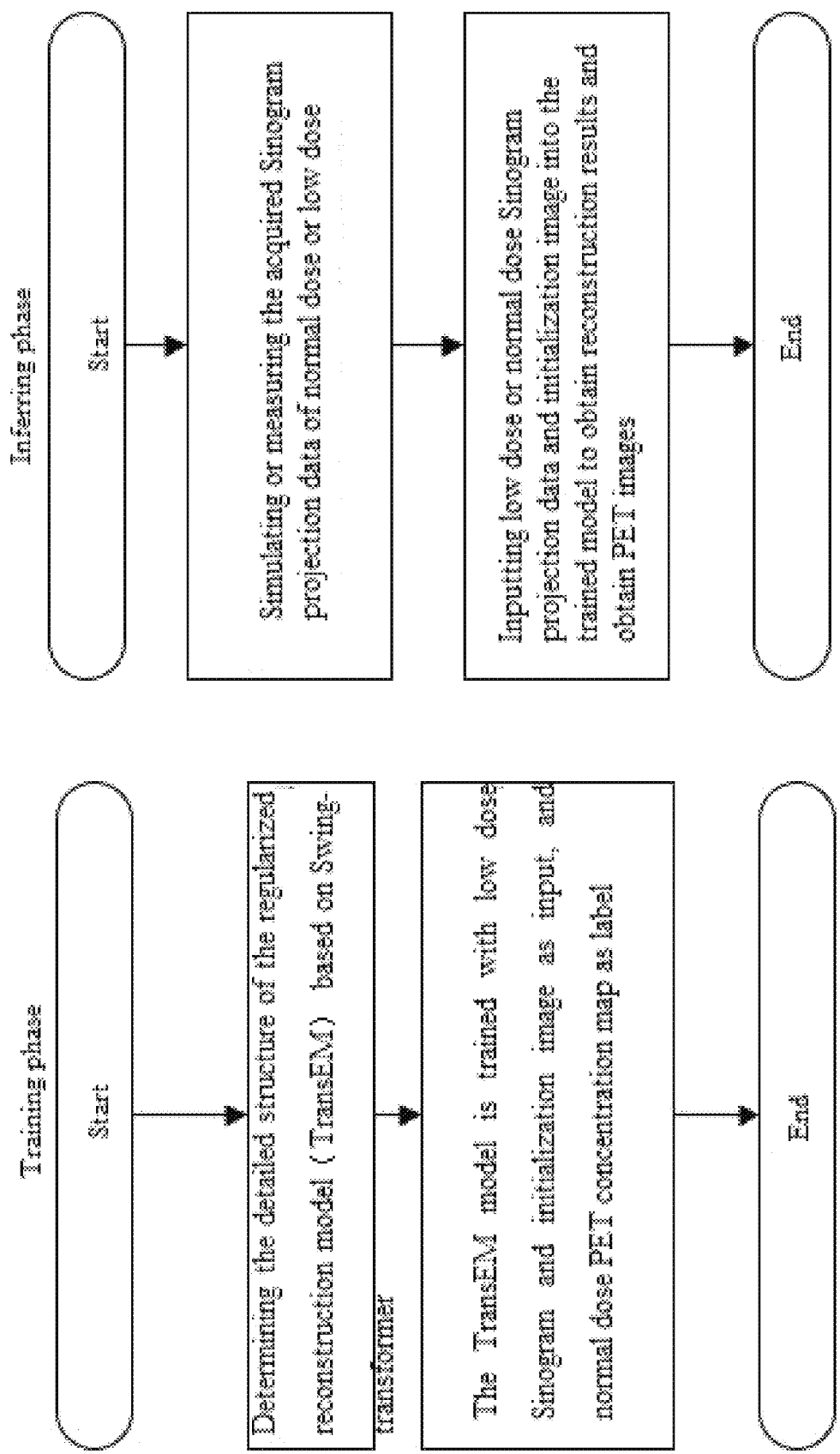
FIG. 1 shows the step flow diagram of the PET image reconstruction method of the present invention.
Figure 2:
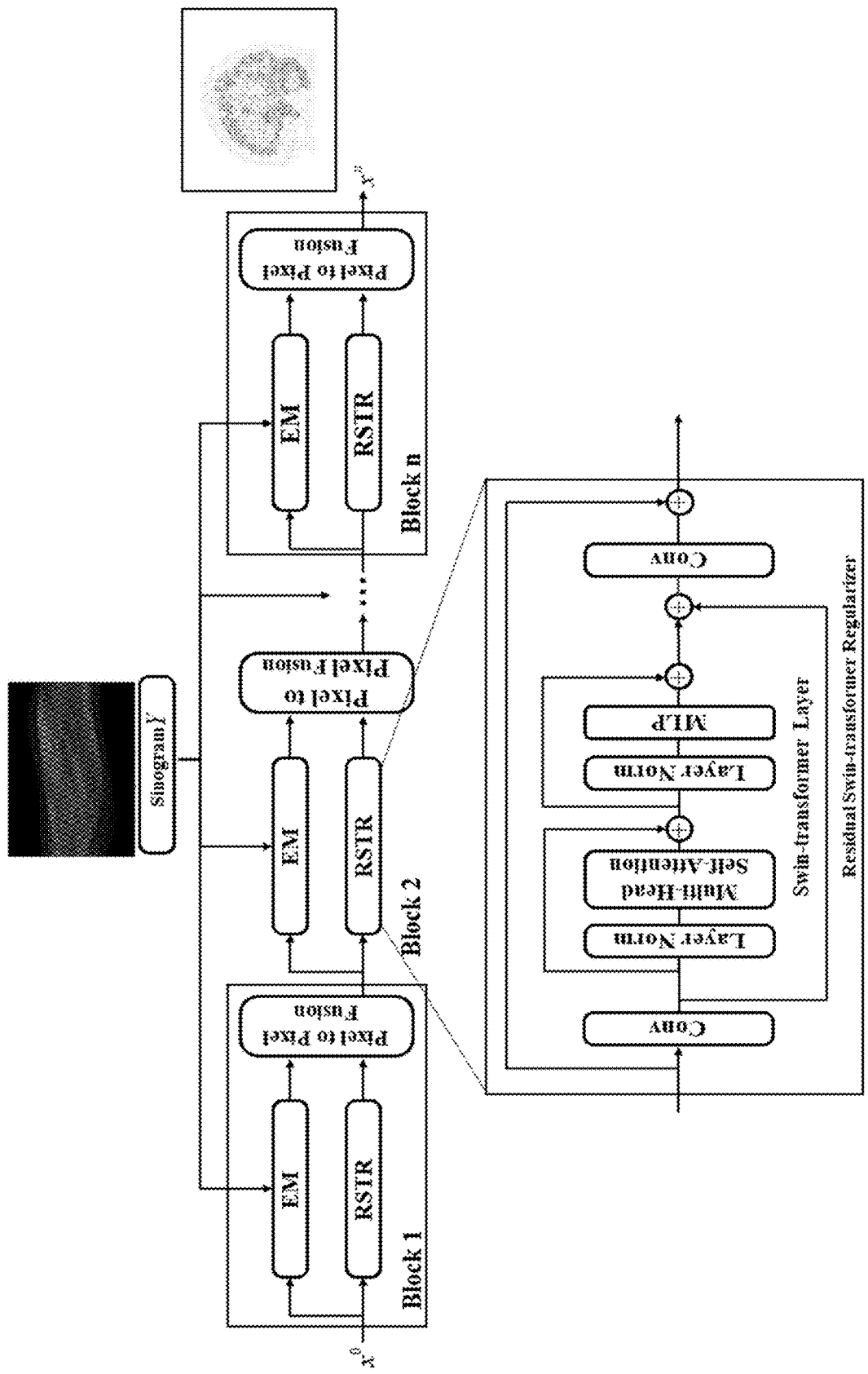
FIG. 2 shows the general structure of the TransEM model in the present invention.

As shown in FIG. 1, the overall implementation process of the PET image reconstruction method based on Swin-Transformer regularization of the present invention specifically comprises the following steps:

Training Phase (1) Determining the detailed structure of a reconstruction model based on Swin-transformer regularization. The input of the model is a low dose or normal dose Sinogram and an initialization image, and the output is a reconstructed PET image. The model is called TransEM. As shown in FIG. 2, the TransEM model is composed of several iterative modules cascaded, and each iterative module is composed of an EM iterative layer, a regularization layer based Swin-transformer, and a pixel to pixel image fusion layer.

For EM iteration layer, giving an input image $x^{k-1} \in \Box^{C \times H \times W}$, wherein, C, H, and W respectively represent the number of channels, image height and image width, an output image can be obtained by the following formula:

$$x^k_{EM} = x^{k-1} \frac{1}{\sum A^T \cdot 1} \sum A^T \cdot \frac{y}{A \cdot x^{k-1}}$$

wherein, A represents the forward projection operator, $A^T$ represents the back projection operator, and y represents the Sinogram projection data.

The regularization layer based Swin-transformer is used to learn the prior information used to represent the image, including a convolution kernel used to extract the shallow features of the image with a convolution kernel size 3×3, a Swin-Transformer layer used to extract the deep features of the image, adopting a window shift attention mechanism, and the window size is 4×4, and a convolution layer with a convolution core size 3×3 and a residual connection are used to fuse deep and shallow features, the output result of the regularization layer is obtained by the following formula:

$$r^k = RSTR(x^{k-1})$$

Specifically, the input image changes from a single channel to a channel number of C through the convolution layer, and then changes from a channel number of C to a single channel through the layer normalization, the shifted-window multi-head self-attention layer, the full connection layer, and the final convolution layer. At the same time, the residual connection is used to enhance the convergence. The specific formula is as follows:

$$X_1 = Conv_{3 \times 3}(x^{k-1})$$
$$X_2 = WSMSA(LN(X_1)) + X_1$$
$$X_3 = MLP(LN(X_2)) + X_2$$
$$r^k = Conv_{3 \times 3}(X_3) + X_0$$

wherein, $Conv_{3 \times 3}$ represents the convolution layer with a convolution core size 3×3, WSMSA represents the shifted-window multi-head self-attention layer, MLP represents the full connection layer, LN represents the layer normalization.

The pixel to pixel image fusion layer realizes the fusion of the output results of the EM iteration layer and the output results of the regularization layer based Swin-transformer at the pixel level. The fused image is obtained by the following formula:

$$x^k = \frac{2 x^k_{EM}}{1 - \frac{r^k}{\alpha \sum A^T \cdot 1} + \sqrt{(1 - \frac{r^k}{\alpha \sum A^T \cdot 1})^2 + 4 \frac{x^k_{EM}}{\alpha \sum A^T \cdot 1}}}$$

wherein, α is the learnable parameter of the model.

(2) In the training phase, the reconstruction model is trained with a normal dose PET activity map as a label and a low dose Sinogram as an input.

Firstly, initializing the model parameters, comprising parameters α, convolution layer parameters in the regularization layer, and swin-transformer layer parameters, using a random normal distribution to initialize.

Then, inputting the low dose Sinogram projection data and initialization image into the reconstruction model. The initialization image is initialized with 0, and forward propagation calculating the output results of each iteration module. Selecting the output results of the last iteration module as the final output, that is, the corresponding normal dose PET image.

Then, calculating the loss function between the model output and the normal dose PET activity map, and calculating the gradient of the loss function to each variable, the loss function uses mean square loss; The Adam optimizer is used to update all the learnable parameters in the model until the value of the loss function is basically unchanged.

Finally, the model is validated by the validation set samples, and the model with the best performance on the validation set is selected as the final reconstruction model.

Inferring phase
(1) Measuring or simulating the normal dose or low dose Sinogram projection data.
(2) Using the normal dose or low dose Sinogram projection data and initialization image as input, the trained reconstruction model directly outputs normal dose PET reconstruction image.

The following experiments are conducted based on simulated low dose PET data to verify the effectiveness of this embodiment. The simulation data set used includes 20 brain data samples, the simulation tracer is $^{18}$F-FDG, and the count of simulated normal dose projection data is $5 \times 10^6$, the count of low dose projection data is $5 \times 10^5$. For each sample, 10 2D slices are selected from the cross section, sagittal plane and coronal plane, and 17 samples are used as training data. There are 510 groups of training data in total, two samples have 60 groups of data for testing, and the remaining sample has 30 groups of data for validation.

TransEM is implemented through pythoch1.7.0 and trained on the host with RTX3090. The optimizer is Adam. The initial learning rate is 0.00001. The batch size is 16. A total of 30 epochs are trained. The epochs with the best performance on the verification set are used to evaluate the test set.

Figure 3:
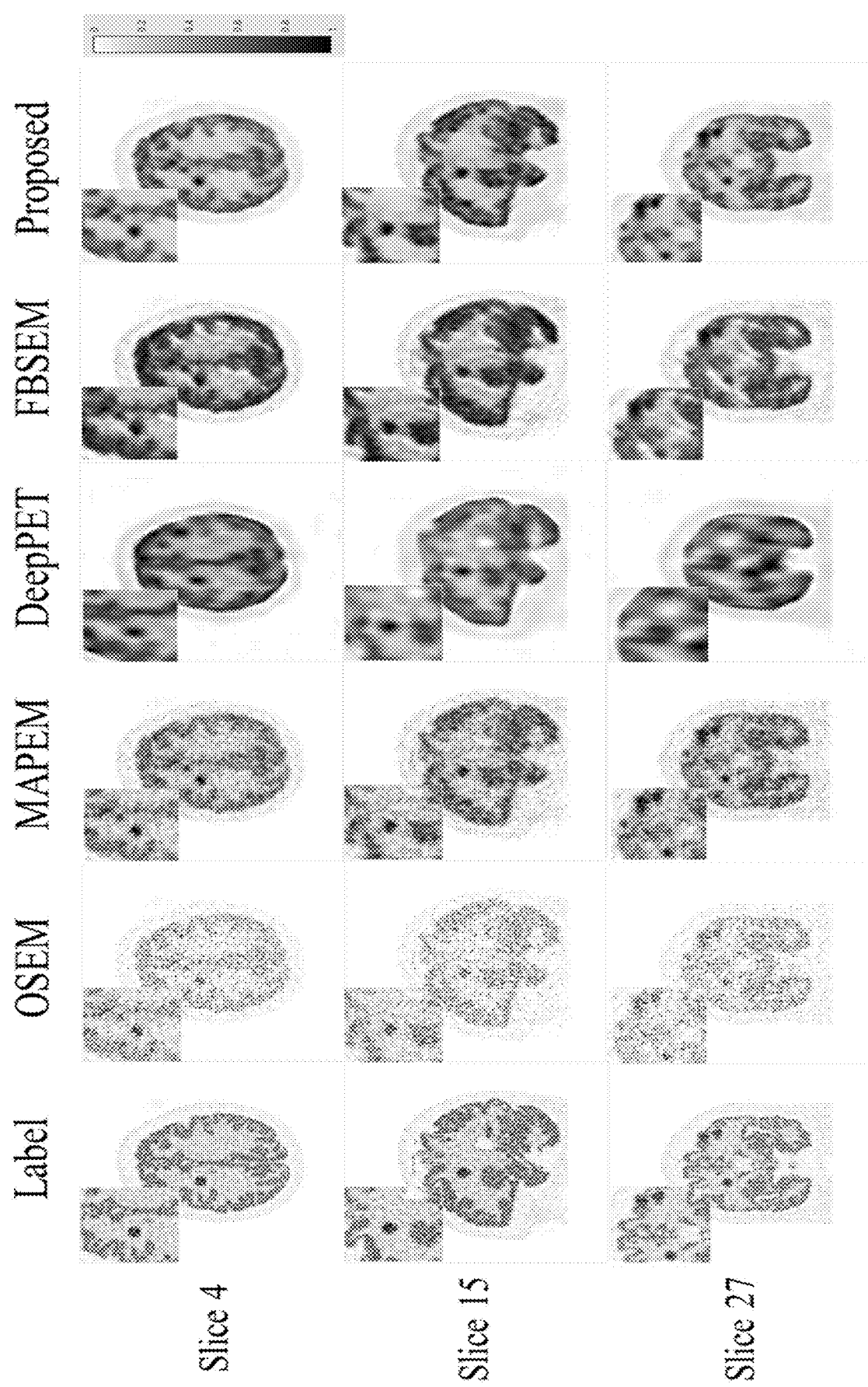
FIG. 3 shows the normal dose PET activity map and reconstruction results obtained by different methods using low dose Sinogram projection data in three slice directions. Lines 1 to 3 correspond to cross-sectional slice images, sagittal slice images, and coronal slice images, and columns 1 to 6 correspond to normal dose PET activity maps, OSEM reconstruction results, MAPEM reconstruction results, DeepPET reconstruction results, FBSEM reconstruction results, and TransEM reconstruction results of the present invention.

We use the structure similarity SSIM, peak signal to noise ratio (PSNR) and average contrast recovery coefficient (MCRC) to evaluate the experimental results. The larger the three indicators are, the better the image quality is. Both SSIM and MCRC are between 0 and 1. Table 1 shows the evaluation index data of different methods. It can be seen that the results of TransEM reconstruction SSIM, PSNR and MCRC have the best performance among the five methods. FIG. 3 shows the normal dose PET activity map and the reconstruction results obtained by different methods using low dose Sinogram projection data in three slice directions. It can be seen that TransEM retains excellent structural information while suppressing noise. Therefore, the experimental results show that the method of the present invention has advantages in solving the reconstruction problem of low dose PET.

TABLE 1

|  | SSIM<br>mean ± std | PSNR<br>mean ± std | MCRC<br>mean |
| --- | --- | --- | --- |
| OSEM | 0.84 ± 0.03 | 19.24 ± 2.34 | 0.5109 |
| MAPEM | 0.86 ± 0.02 | 22.30 ± 2.25 | 0.7983 |

TABLE 1-continued

| | SSIM mean ± std | PSNR mean ± std | MCRC mean |
|---|---|---|---|
| DeepPET | 0.84 ± 0.04 | 21.77 ± 2.13 | 0.6813 |
| FBSEM | 0.88 ± 0.02 | 22.94 ± 1.84 | 0.8518 |
| TransEM | 0.89 ± 0.02 | 23.10 ± 1.86 | 0.8718 |

The above description of the embodiments is for the convenience of ordinary technicians in the technical field to understand and apply the present invention. It is obvious that those skilled in the art can easily make various modifications to the above embodiments, and apply the general principles described herein to other embodiments without creative labor. Therefore, the present invention is not limited to the above embodiments. According to the disclosure of the present invention, those skilled in the art should make improvements and modifications to the present invention within the protection scope of the present invention.

The invention claimed is:

1. A Positron Emission Tomography (PET) image reconstruction method based on Swin-Transformer regularization, wherein, comprising the following steps:

(1) detecting a biological tissue injected with a normal dose of a tracer, collecting a Sinogram projection data $S_1$ corresponding to the normal dose, and then conducting PET reconstruction of the Sinogram projection data $S_1$ to obtain a corresponding PET activity map $P_1$;

(2) downsampling the Sinogram projection data $S_1$ to obtain a low dose Sinogram projection data $S_2$;

(3) performing steps (1) and (2) for multiple times to obtain a large number of samples, each sample contains $P_1$ and $S_2$, and then dividing all samples into a training set, a verification set and a test set;

(4) building a TransEM model based on Swin-Transformer regularization, using $S_2$ in the training set samples as an input, $P_1$ as a label, and training the model to obtain a PET image reconstruction model; and (5) inputting the $S_2$ in the test set sample into the PET image reconstruction model, and then directly outputting a corresponding PET activity map;

wherein, the TransEM model is composed of several iterative modules cascaded, and each iterative module is composed of an EM iterative layer, a regularization layer based Swin-transformer, and a pixel to pixel image fusion layer connected in turn;

wherein, the specific mathematical operation mode of the EM iteration layer is as follows:

$$x_{EM}^k = x^{k-1} \frac{1}{\sum A^T \cdot 1} \sum A^T \cdot \frac{y}{A \cdot x^{k-1}}$$

wherein, $x_{EM}^k$ represents the output image of EM iteration layer in the kth iteration module, $x^{k-1}$ represents the input image of EM iteration layer in the kth iteration module, i.e. the output image of the k−1 iteration module, k represents the natural number greater than 1, A represents the forward projection operator, $A^T$ represents the back projection operator, y represents the Sinogram projection data $S_2$ input to the model, 1 represents the normalized image, the pixel value is 1, and the image size is the same as the Sinogram projection data $S_2$.

2. The PET image reconstruction method according to claim 1, wherein, the regularization layer is composed of a convolution layer D1, a Swin-Transformer layer and a convolution layer D2, wherein, the convolution layer D1 is used to extract shallow features of the input image, and the convolution kernel size is 3×3;

the Swin-Transformer layer is used to extract deep features of the image, adopting a window shift attention mechanism, and the window size is 4×4;

the convolution layer D2 uses residual connection to fuse the deep and shallow features of the image, and then outputs, the convolution kernel with a size of 3×3.

3. The PET image reconstruction method according to claim 2, wherein, the Swin-Transformer layer consists of a layer normalization module L1, a shifted-window multi-head self-attention layer, a layer normalization module L2, and a full connection layer connected in turn, the output of the shifted-window multi-head self-attention layer and the output of the convolution layer D1 are superposed as the input of the layer normalization module L2.

4. The PET image reconstruction method according to claim 2, wherein, the input of the convolution layer D2 is the result of the superposition of the input of the layer normalization module L2, the output of the full connection layer and the output of the convolution layer D1, the output of the convolution layer D2 is superposed with the input of the convolution layer D1 as the final output of the regularization layer.

5. The PET image reconstruction method according to claim 1, wherein, the image fusion layer is used to fuse the output results of the EM iteration layer and the regularization layer at the pixel level, the specific mathematical operation mode is as follows:

$$x^k = \frac{2x_{EM}^k}{1 - \frac{r^k}{\alpha \sum A^T \cdot 1} + \sqrt{(1 - \frac{r^k}{\alpha \sum A^T \cdot 1})^2 + 4\frac{x_{EM}^k}{\alpha \sum A^T \cdot 1}}}$$

wherein, $x^k$ represents the output result of the image fusion layer in the kth iteration module, that is, the output image of the kth iteration module, $r^k$ represents the output image of the regularization layer in the kth iteration module, and $x_{EM}^k$ represents the output image of the EM iteration layer in the kth iteration module, a is the learnable parameter of the model.

6. The PET image reconstruction method according to claim 1, wherein, the specific process of training the TransEM model in the step (4) is as follows:

4.1 initializing model parameters, including learnable parameters, convolution layer parameters, learning rate, optimization algorithm, and a maximum number of iterations;

4.2 inputting the Sinogram projection data $S_2$ in the training set sample into the TransEM model, forward propagation calculating to obtain the output results of each iteration module, and selecting the output results of the last iteration module as the PET activity map obtained by model reconstruction;

4.3 calculating the loss function between the PET activity map obtained from the model reconstruction and the corresponding label, and using gradient descent method to backpropagation update the model parameters according to the loss function; and 4.4 using the optimization algorithm to update the model parameters iteratively until the loss function is minimized to converge or reaches the maximum number of iterations, that is, the training is completed.

7. The PET image reconstruction method according to claim 1, wherein, when the model training is completed, the validation set samples are used to validate the model, and the model parameters are fine tuned according to performance of the model in the validation set as the final PET image reconstruction model.

\* \* \* \* \*